No. 845,581. PATENTED FEB. 26, 1907.
G. D. RUSSELL & P. H. ARMISTEAD.
HARVESTING APPARATUS.
APPLICATION FILED JUNE 8, 1906.
2 SHEETS—SHEET 1.
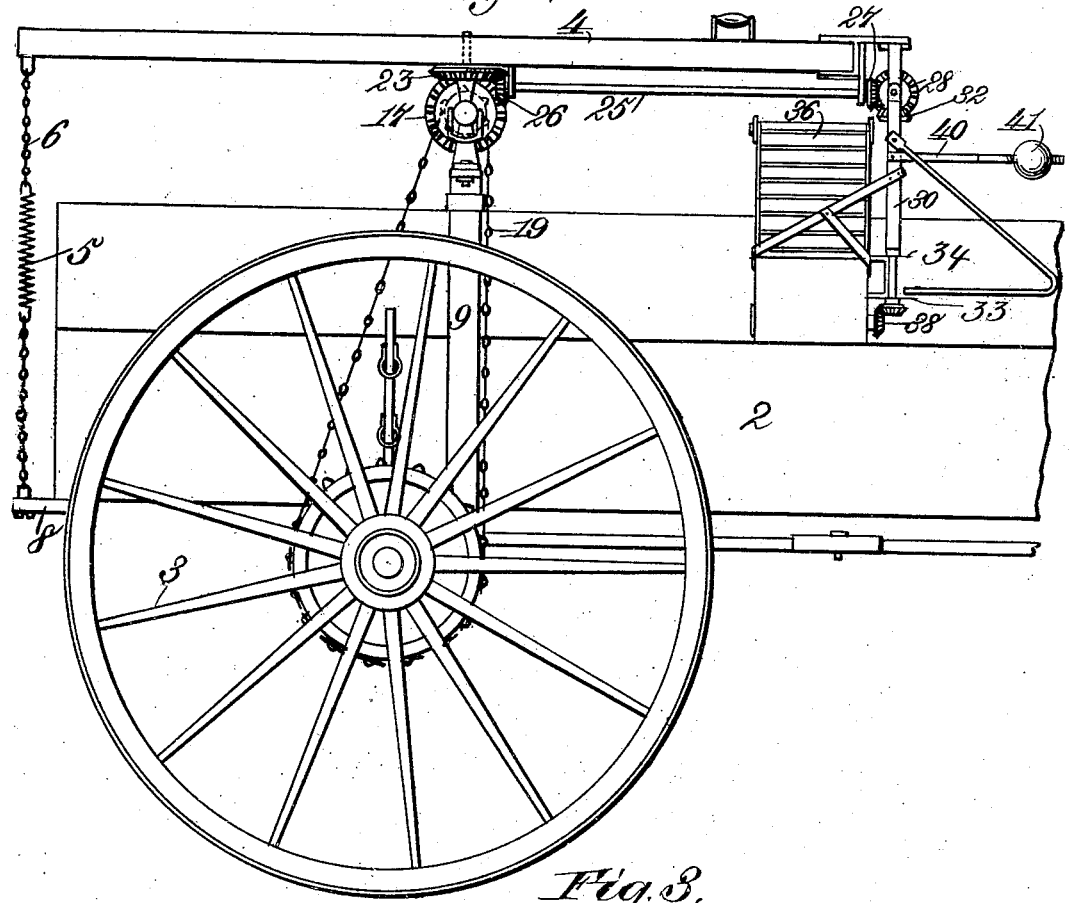
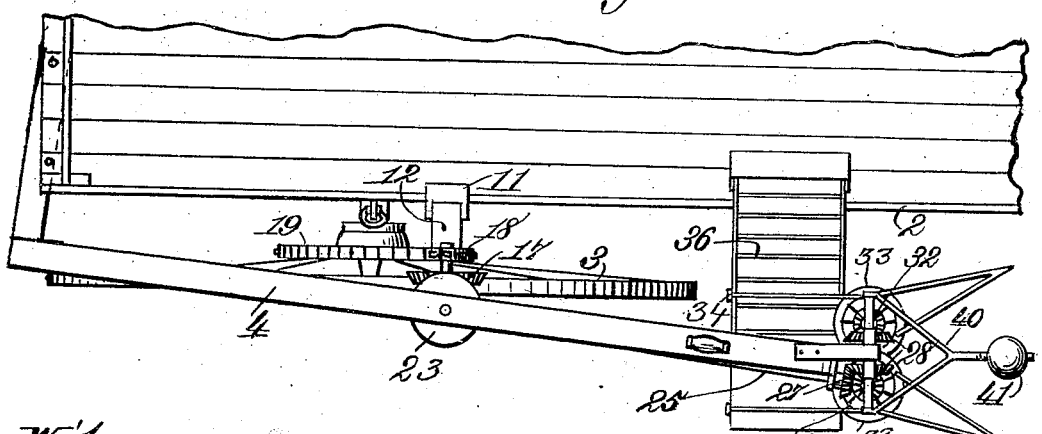
Witnesses,
Robert Everett,
Inventors,
George D. Russell,
Patrick H. Armistead,
By James L. Norris
Atty No. 845,581. PATENTED FEB. 26, 1907.
G. D. RUSSELL & P. H. ARMISTEAD.
HARVESTING APPARATUS.
APPLICATION FILED JUNE 8, 1906.
2 SHEETS—SHEET 2.
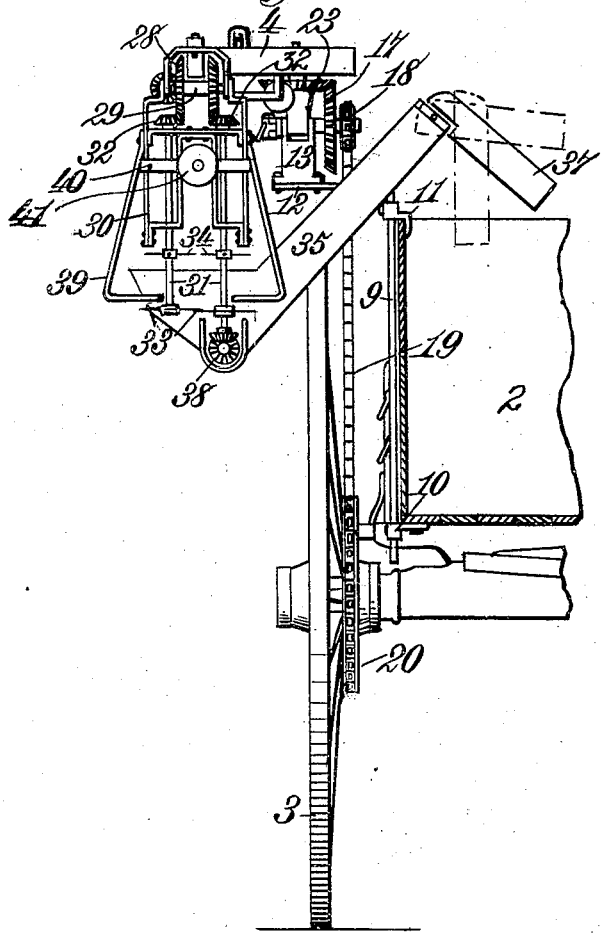
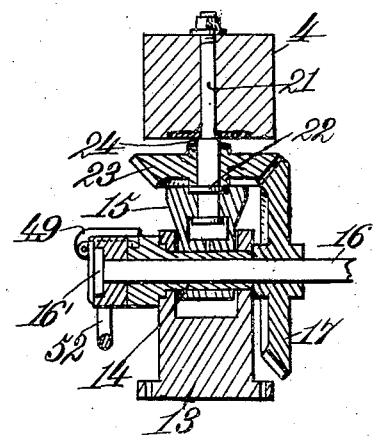
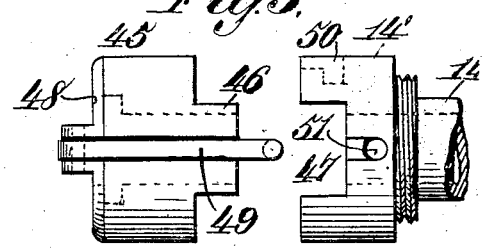
Witnesses.
Inventors.
George D. Russell,
Patrick H. Armistead,
By James L. Norris,
Atty.

UNITED STATES PATENT OFFICE.

GEORGE D. RUSSELL AND PATRICK H. ARMISTEAD, OF BAIRD, TEXAS.

HARVESTING APPARATUS.

No. 845,581. Specification of Letters Patent. Patented Feb. 26, 1907.

Application filed June 8, 1906. Serial No. 320,811.

*To all whom it may concern:*

Be it known that we, GEORGE D. RUSSELL and PATRICK H. ARMISTEAD, citizens of the United States, residing at Baird, in the county of Callahan and State of Texas, have invented new and useful Improvements in Harvesting Apparatus, of which the following is a specification.

This invention relates to harvesting apparatus; and the object of the invention is to provide an effective apparatus of this character which may be operated with the minimum amount of power, which shall be strong, durable, and simple in construction and yet light.

The apparatus may be employed with advantage in many different connections, it being of particular use for heading Kafir corn and for the purpose of conveying the severed heads to a suitable place, such as into the body of a vehicle, the apparatus being of such a nature that it can be readily attached to such a vehicle and as easily detached therefrom.

The apparatus is so related with the wagon or like vehicle that practically no obstruction is offered to the loading or unloading of the wagon or other vehicle.

By virtue of the apparatus we are enabled to secure economy both in time and labor saved over the usual methods of harvesting corn or other grains.

In the drawing accompanying and forming a part of this specification we show a form or embodiment of the invention which to enable those skilled in the art to practice said invention we will set forth in detail in the following description, while the novelty of said invention will be included in the claims succeeding said description.

Referring to the drawings, Figure 1 is a side elevation, Fig. 2 is a front elevation, and Fig. 3 is a top plan view, of a harvesting apparatus involving our invention and showing the same combined with a wagon. Fig. 4 is a detail view in section of certain driving mechanism and a beam supported thereby. Fig. 5 is a detail view of certain clutch mechanism hereinafter particularly described.

As hereinbefore intimated, our harvesting apparatus may be employed in connection with a vehicle. This is not essential, although it is desirable, for we can actuate the operative parts of the apparatus from the vehicle and can utilize the body of the latter to receive the corn or other grain separated from the stalks by the harvesting apparatus.

In the drawings we have shown an ordinary farm-wagon as a suitable vehicle in connection with which the harvesting apparatus may be advantageously employed, and said wagon is denoted in a general way by 2 and its wheels by 3. Only one of the wheels, however, appears in the drawings. Certain of the moving parts of the harvesting apparatus derive their motion from the wheel 3. The box or body of the wagon constitutes a suitable receptacle for the heads of corn cut from the stalks by suitable cutting mechanism, one convenient type of which will be hereinafter described.

The cutting mechanism and an elevator operative therewith may be carried in any desirable way—such, for example, as by the carrier 4, which carrier is represented as consisting of an elongated beam sustained in an advantageous way between its ends, as will hereinafter appear, said cutting mechanism and elevator and certain adjunctive devices being supported by the carrier or beam at one end, while a coiled spring, as 5, is connected with the opposite end of said carrier or beam, the office of said spring being to counterbalance the elevator and cutting mechanisms supported at the forward end of the carrier or beam 4. In the present case the spring 5 is of the retractile type and is connected with the beam 4 through the intervention of a chain or other equivalent connection 6. From the lower end of the spring a similar chain extends and is connected with one end of the beam 8, which may be bolted or otherwise fastened to the bottom of the body of the wagon 2.

The beam 4 in the present case is sustained by a standard 9 in such a way that said beam can be moved laterally or in a horizontal direction or can be swung upwardly and downwardly, so as to bring the cutting mechanism in position to act upon the heads of corn to be harvested. The standard 9 has adjustably connected therewith at superposed points the plate 10 and hook 11, the first-mentioned to be attached to the bottom of the wagon-body and the hook to be engaged over the upper edge of said body. By virtue of the adjustment of the plate and hook we can readily adapt the standard to wagon-bodies of different heights.

The standard or upright 9 is shown as having at its top an outwardly-extending horizontally-disposed head 12, upon which is mounted the boxing or bearing 13. Through the upper portion of the bearing 13 is shown as extending a hollow pin 14, which in the present case constitutes a pivot for the auxiliary bearing 15, which, like the main bearing or boxing 13, may consist of a casting. We have represented a pin or shaft 16 as extending entirely through the hollow pin 14, and said shaft 16 has fixed thereto a bevel-gear 17 and a sprocket-wheel 18, the latter being connected by a sprocket-chain 19 with the sprocket-wheel 20, suitably fastened to the traction-wheel 3, so that the said sprocket-wheel 18 may be driven from the traction-wheel 3 through the intermediate parts when the wagon 2 is in motion. We will hereinafter describe a convenient mechanism for throwing the shaft 16 into and out of action. When the sprocket-wheel 18 is rotated, the shaft 16, and consequently the bevel-gear 17, will be rotated.

The bearing 15 has swiveled thereto and extending upward therefrom the vertically-disposed pin 21, having a peripheral shoulder 22, set in a countersink in the upper side of said auxiliary bearing. A bevel-gear 23 is represented as upheld by said shoulder 22 and bearing 15 and as meshing with the bevel-gear 17. The pin 21 has a second shoulder 24, upon which the beam 4 rests, by reason of which said beam does not cause the gear 23 to be clamped between the beam 4 and bearing 15, which would be the case were the said beam to directly bear against said bevel-gear 23. It will be understood that the pin 21 serves as a vertical pivot for the beam 4 to permit the latter to be oscillated or swung in a horizontal direction, while the hollow horizontally-disposed pin 14 permits oscillation or swinging of said beam in a vertical direction, so that the cutting mechanism can be moved as required to sever the heads from the stalks. The two motions of the beam can be secured without throwing any of the operative parts out of action.

We have shown a shaft 25 as extending longitudinally of the beam 4 in front of the gear 23, said shaft being sustained by suitable bearings pendent from the beam. On the inner or rear end of said shaft is fastened a bevel-gear 26 to mesh with said bevel-gear 23. At the forward end of said shaft is fastened a bevel-gear 27, which meshes with the outer bevel-gear of two connected bevel-gears 28, rotative with a shaft 29, sustained by a suitable bearing depending from the forward end of the beam 4. This shaft 29 constitutes a pivot for the frame 30. The frame 30 suitably supports the vertically-disposed shafts 31, having at their upper ends the bevel-gears 32, which mesh, respectively, with the bevel-gears 28, whereby the said shafts 31 may be operated through the agency of their connections with the traction-wheel 3 when the wagon 2 is in motion.

We have shown fastened to the lower ends of the oppositely-rotative vertically-disposed shafts cutting-disks 33, the marginal portions of which overlap and engage, so that said disks are self-sharpening. Their bevel edges coöperate to cut a head of corn from the stalk. The shafts 31 have fastened thereto above the cutting disks or knives 33 the reels 34, which rotate in a horizontal plane above the lower open end of the casing 35 of the elevator 36. The arms of the reels as the latter rotate do not engage with each other, but they do coöperate in directing the heads of corn severed from the stalks by the disks 33 into the open lower end of the elevator-casing 35, where such heads can be taken by the elevator upward through its casing and delivered into the box or body of the wagon. The elevator-casing 35 is rigidly connected with the pendent pivotally-mounted frame 30, so that said elevator can swing with the beam 4. The upper end of the elevator-casing 35 has a pivotally-mounted trough-like extension 37, which is adapted to assume different angles and which serves to direct the heads of corn lifted by the elevator 36 into the wagon box or body when said casing 35 is swung from over the wagon box or body. The elevator 36 receives its motion from one of the vertically-disposed shafts 31, the shaft on the right serving for such purpose and being shown as connected with the elevator through bevel-gearing, (denoted in a general way by 38.)

To the outer side of the frame 30, immediately below the head thereof, we have shown as fastened rods 39, which diverge downward and then are bent inward immediately above the two disks 33, said inwardly-bent portions converging inward toward the said cutting-disks. These two rods 39 constitute a guide for directing the stalks into the space therebetween, whereby the knives or disks 33 can obtain proper access to the heads of corn, which when severed by said disks or knives are disposed of as hereinbefore set forth.

Notwithstanding the fact that the frame 30 is flexibly mounted, we provide means which tends at all times to cause said frame 30 to assume a vertical position, which is advantageous, owing to the fact that the beam 4, from which said frame is pendent, assumes different angular positions. The means shown for such purpose consists of a rod 40, having a counterweight 41, adjustable on the outer end of said rod, the inner portion of the rod being forked and the branches thereof being suitably fastened to the sides of the frame 30.

In Figs. 4 and 5 we have shown in detail an effective mechanism for throwing the shaft or spindle 21 into and out of action, whereby the cutting mechanism, elevator, and certain other parts may be readily controlled. The shaft 16, it will be remembered, extends through the hollow pin or sleeve 14. Said sleeve or hollow pin 14 is non-rotative with the shaft 16 and is provided with a head 14', tapped into the bearing or casting 13. The shaft 16 is rotatively connected with the clutch member 45, said clutch member having on its inner side an extension 46 to coöperate with a notch 47 in the stationary head 14'. The said shaft 16 has at one end thereof—shown at the left in Fig. 4, for example—a head 16' to fit a countersink in the outer surface of the clutch member 45, a removable face-plate 48 preventing the shaft 16 from moving longitudinally with respect to said clutch member 45, although said shaft can freely rotate in said clutch member. When the gears 17 and 23 are in mesh, the extension 46 will be out of the notch 47, and this relation will be maintained by a hook, as 49, on the clutch member, entering the recess, as 50, on the head 14'. To put the two gears out of mesh, the extension 46 will be entered in the notch 47, whereby the shaft 16 may be moved longitudinally to secure such result, and when such gears are out of mesh the hook 49 will enter a recess, as 51, in the head 14' to hold the parts 14' and 45 together. To facilitate the turning of the clutch member 45 so that the extension 46 thereon can be brought into register with the notch 47, said clutch member may be equipped with a handle, as 52.

What we claim is—

1. In a harvesting apparatus, a carrier mounted for vertical and horizontal oscillation, cutting mechanism supported by said carrier, and an elevator associated with the cutting mechanism for receiving therefrom the harvested material and for conducting the same to a suitable receptacle.

2. In a harvesting apparatus, a carrier mounted for vertical and horizontal oscillation, a vehicle to which said carrier is connected, cutting mechanism supported by said carrier, an elevator associated with the cutting mechanism for receiving therefrom harvested material and for delivering the same to said vehicle, and mechanism operated from the vehicle for actuating the cutting mechanism and elevator.

3. In a harvesting apparatus, a carrier mounted for vertical and horizontal oscillation, cutting mechanism supported by said carrier, an elevator associated with the cutting mechanism for receiving therefrom the harvested material and for conducting the same to a suitable receptacle, said cutting mechanism and elevator being at one side of the center of motion of said carrier, and counterbalancing means for the cutting mechanism and elevator, connected with said carrier at the opposite side of said center of motion.

4. In a harvesting apparatus, a carrier mounted for vertical and horizontal oscillation, cutting mechanism and an elevator supported at one side of the center of motion of the carrier, a counterbalancing-spring for the cutting mechanism and elevator connected with said carrier at the opposite side of said center, the elevator being in position to receive the articles harvested by the cutting mechanism.

5. In a harvesting apparatus, an oscillatory carrier, a frame flexibly supported by said carrier, means tending at all times to hold said frame positively in an operative position, cutting mechanism supported by said frame, and an elevator movable with the carrier for receiving from the cutting mechanism harvested material and for conducting the same to a suitable receptacle.

6. In a harvesting apparatus, an oscillatory carrier, a frame flexibly supported by said carrier, and cutting mechanism and an elevator supported by said frame, the elevator being in position to receive articles harvested by the cutting mechanism.

7. In a harvesting apparatus, a carrier mounted for oscillation, a frame flexibly supported by the carrier, cutting mechanism and an elevator supported by the frame, and means tending to hold the frame in a vertical position.

8. In a harvesting apparatus, a carrier mounted for oscillation, a frame flexibly supported by said carrier, an elevator and cutting mechanism supported by said frame, the elevator being located to receive articles harvested by the cutting mechanism, and a counterbalancing-weight connected with the frame and tending to maintain the same in a vertical position.

9. In a harvesting apparatus, a standard, a bearing supported by said standard, a hollow pin sustained by said bearing, a shaft extending through the hollow pin, a second bearing oscillatory on said hollow pin, a carrier, a pivot for said carrier at an angle to said hollow pin and supported by said second bearing, means for operating said shaft, cutting mechanism supported by said carrier, and means operative from said shaft for actuating said cutting mechanism.

10. In a harvesting apparatus, a standard, a bearing supported by said standard, a hollow pin sustained by said bearing, a shaft extending through said hollow pin, a second bearing supported for rocking motion by said hollow pin, a vertically-disposed pin swiveled upon the second bearing, a carrier, said second pin constituting a pivot for said carrier, intermeshing gears, one of which is fastened to the shaft, and the other of which surrounds said second pin, cutting mechanism supported by the carrier, and means receiving its motion from the gear around said second pin, for actuating said cutting mechanism.

11. In a harvesting apparatus, a standard, a bearing supported by said standard, a hollow pin sustained by said bearing, a shaft extending through said hollow pin, a second bearing supported for rocking motion by said hollow pin, a vertically-disposed pin swiveled upon the second bearing, a carrier, said second pin constituting a pivot for said carrier, intermeshing gears, one of which is fastened to the shaft, and the other of which surrounds said second pin, cutting mechanism supported by the carrier, means receiving its motion from the gear around said second pin, for actuating said cutting mechanism, a vehicle with which said standard is connected, and means operated from a wheel of said vehicle for turning said shaft.

12. In a harvesting apparatus, a carrier mounted for vertical and horizontal oscillation, a frame flexibly pendent from said carrier, rotary shafts supported by said frame, overlapping engaging disks fixed to the respective shafts, an elevator and its casing supported by the frame, a vehicle with which the carrier is associated, a trough pivotally connected to the elevator-casing for directing material into the vehicle when the casing is swung from thereover, and means for positively directing articles cut by the disks into said casing.

In testimony whereof we have hereunto set our hands in presence of two subscribing witnesses.

GEORGE D. RUSSELL.
PATRICK H. ARMISTEAD.

Witnesses:
  R. G. POWELL,
  THOS. H. FLOYD.